United States Patent
Poertzgen et al.

[11] Patent Number: 5,979,999
[45] Date of Patent: Nov. 9, 1999

[54] ELECTROHYDRAULIC BRAKING SYSTEM

[75] Inventors: Gregor Poertzgen, Koblenz; Karl-Friedrich Wörsdörfer, Budenheim; Kurt Mohr, Halsenbach/Ehr, all of Germany

[73] Assignee: Lucas Industries public limited company, United Kingdom

[21] Appl. No.: 09/178,334

[22] Filed: Oct. 23, 1998

Related U.S. Application Data

[63] Continuation of application No. PCT/EP97/02150, Apr. 25, 1997.

[30] Foreign Application Priority Data

Apr. 25, 1996 [DE] Germany ............................ 196 16 538

[51] Int. Cl.$^6$ ................................ B60T 8/40; B60T 8/36
[52] U.S. Cl. ................................ 303/116.1; 303/119.1
[58] Field of Search ................................ 303/3, 9.61, 10, 303/11, 15, 113.4, 115.4, 115.5, 116.1, 116.2, DIG. 1, DIG. 2, DIG. 11

[56] References Cited

U.S. PATENT DOCUMENTS

| | | |
|---|---|---|
| 4,723,412 | 2/1988 | Buschmann . |
| 5,195,810 | 3/1993 | Ocvirk et al. ........................ 303/116.1 |
| 5,282,676 | 2/1994 | Takeda et al. ........................ 303/113.2 |
| 5,447,363 | 9/1995 | Fukamachi ............................ 303/125 |
| 5,484,194 | 1/1996 | Reinartz et al. . |
| 5,547,264 | 8/1996 | Tozu et al. ............................ 303/9.62 |
| 5,567,021 | 10/1996 | Gaillard ............................ 303/3 |
| 5,722,744 | 3/1998 | Kupfer et al. ........................ 303/189 |

FOREIGN PATENT DOCUMENTS

| | | |
|---|---|---|
| 0 348 270 A1 | 12/1989 | European Pat. Off. . |
| 34 08 872 A1 | 9/1985 | Germany . |
| 42 01 732 A1 | 7/1993 | Germany . |
| WO 96/00236 | 1/1993 | WIPO . |
| WO 96/11129 | 4/1996 | WIPO . |

*Primary Examiner*—Chris Schwartz
*Attorney, Agent, or Firm*—MacMillan, Sobanski & Todd, LLC

[57] ABSTRACT

An electrohydraulic braking system for motor vehicles with a brake master cylinder which can be actuated by a brake pedal. A wheel brake is coupled with at least with one vehicle wheel. The wheel brake can be connected with the brake master cylinder in order to subject the wheel brake to pressurized hydraulic fluid. A hydraulic pump, and a hydraulic pressure accumulator supplied by the pump, form an alternative source of pressurized hydraulic fluid which can be supplied to the wheel brake through a control valve arrangement in a controlled manner in order to subject the wheel brake to pressurized hydraulic fluid. A shut-off valve is arranged between the hydraulic pump and the hydraulic pressure accumulator in order to selectively make or shut-off a connection between the hydraulic pump and the hydraulic pressure accumulator to permit the hydraulic pump, in certain situations, to rapidly pressurize the braking system without having to simultaneously recharge the hydraulic pressure accumulator.

7 Claims, 1 Drawing Sheet

ELECTROHYDRAULIC BRAKING SYSTEM

CROSS-REFERENCES TO RELATED APPLICATIONS

This application is a continuation of International Application PCT/EP97/02150, filed Apr. 25, 1997, and which designated the United States.

BACKGROUND OF THE INVENTION

The intention relates to an electrohydraulic braking system for motor vehicles with a brake cylinder which can be actuated by a brake pedal and a pressureless reservoir for hydraulic fluid, a braking means which is coupled with at least one vehicle wheel and which can be connected with the brake cylinder in order subject the braking means to pressurized hydraulic fluid, a hydraulic pump and a hydraulic pressure accumulator supplied by same for providing pressurized hydraulic fluid which can be supplied to the braking means through a control valve arrangement in a controlled manner in order to subject the braking means to pressurized hydraulic fluid ("brake-by-wire").

In such an electrohydraulic braking system the braking energy required for braking the motor vehicle is provided by an electrically operated braking system In order to brake the vehicle with a minimum delay in the case of an unexpected failure of the electrically operated braking system, the braking system is additionally equipped with a hydraulic auxiliary braking system for the immediate actuation of the brakes.

The range of application for such an electrohydraulic braking system includes antilock control systems, antislip control systems, electronic brake power distribution, as well as driving dynamics control systems.

Due to the fact that in an electrically operated braking system the driver's request is detected by means of sensors at the brake pedal and is supplied to the electronic control unit in the form of electric signals, such systems are also referred as "brake-by-wire" systems. For the redundant hydraulic emergency system a direct connection between the brake pedal and the brakes must be established in a conventional manner via a brake pressure transducer as well as hydraulic lines, which arrangement is also referred to as "push-through". This requires a changeover means so that under normal operating conditions the brake pressure which is generated in the electrical system, and in the event of a defect or a failure of the electric system the brake pressure which is generated in the hydraulic auxiliary system, is transmitted to the brakes.

The control valve arrangement is usually designed as a slide valve so that escapes and leakages are inevitable. Due to this fact, a pressure drop of the hydraulic fluid accommodated in the hydraulic pressure accumulator, in particular in the case of prolonged stop periods, cannot be prevented. In addition, in this known system the components which are arranged down-stream of the hydraulic pressure accumulator (lines, seals, connections, etc.) are permanently subjected to the pressure prevailing in the hydraulic pressure accumulator. This can result in premature material fatigue, leakages and the like.

BRIEF SUMMARY OF THE INVENTION

The invention is therefore based on the object to develop an electrohydraulic braking system with "push-through" capability which avoids the above-mentioned drawbacks and which complies with high safety requirements.

For the solution of this object a shut-off valve is arranged in the initially mentioned braking system between the hydraulic pump and the hydraulic pressure accumulator in order to make or shut off a connection between and the hydraulic pump and the hydraulic pressure accumulator.

Surprisingly, the following advantages can be achieved by these measures:

Due to the fact that the control valve arrangements are preferably constructed as slide valves with design-inherent leakage, the presence of the shut-off valve prevents the brake fluid stored in the hydraulic pressure accumulator from escaping or a pressure drop of the operating pressure in the hydraulic pressure accumulator, respectively. This is of particular importance in cases in which the vehicle remains stationary over a longer period of time.

Leakages due to defects (line ruptures, defective seal seats, etc.) are also prevented.

In a preferred embodiment of the invention the shut-off valve is designed as a seat valve which can be operated electromagnetically. Their design principle renders seat valves inherently leakage-fee so that the idea on which the invention is based can be effected in a particularly simple manner.

In the electrohydraulic braking system for motor vehicles according to the invention an electronic control unit (ECU) is preferably provided which is connected with a first sensor for detecting the static and dynamic conditions which occur in the braking system and in particular at the brake pedal, and which utilizes signals output by the first sensor for the generation of control signals for the shut-off valve.

In addition, the hydraulic pressure accumulator of the inventive electrohydraulic braking system for motor vehicles can be any suitable type of hydraulic pressure accumulator. One suitable type of hydraulic pressure accumulator which may be used in the inventive electrohydraulic braking system is what will be referred to in this application as a "gas pressure accumulator", in which pressurized hydraulic fluid from the braking system acts to compress a gas-filled reservoir within the accumulator. The electronic control unit can be adapted to operate the hydraulic pump depending on a signal of a second sensor in order to charge the hydraulic pressure accumulator.

The ideal operating pressure of the hydraulic pressure accumulator ranges in the order from 130 bar to 160 bar. If a gas pressure accumulator is employed as the hydraulic pressure accumulator the gas filling pressure depends on the gas temperature or the ambient temperature, respectively. This means that in the case in which the gas pressure accumulator has been precharged to a gas filling pressure of 90 bar at a temperature of 20° C. and in which the temperature decreases to −40° C., the gas filling pressure drops to 16 bar.

The pressure in the hydraulic pressure accumulator is monitored by a sensor. Upon a pressure decrease to a value below Pmin, e.g. 110 bar, the shut-off valve opens and the hydraulic pump is put into operation .in order to recharge the pressure accumulator. If, during the recharging operation, a brake actuation becomes necessary, then the shut-off valve provides the possibility to shut off the hydraulic pressure accumulator so that the filling of the wheel brakes with brake fluid can be effected immediately by the hydraulic pump. Since the hydraulic pressure accumulator is shut off, the pump does not deliver brake fluid into the hydraulic pressure accumulator during brake actuation so that a pressure in the wheel brakes can be built up more rapidly.

In addition, the electronic control unit (ECU) can be adapted to operate the shut-off valve in the sense of an interruption of the connection between the hydraulic pump and the hydraulic pressure accumulator as a function of a signal of at least the first sensor, which represents an actuation of the brake pedal, as well as a signal of at least the second sensor, which represents a below a predetermined hydraulic pressure in the hydraulic pressure accumulator.

In addition, the electronic control unit (ECU) can be adapted to operate the shut-off valve in the sense of an interruption of the connection between the hydraulic pump and the hydraulic pressure accumulator and to subject the hydraulic pump to control signals in such a manner that the hydraulic pump generates a predetermined pressure profile which is detected by sensors provided in the braking system and transmitted to the electronic control unit (ECU) in the form of corresponding sensor signals for a comparison between the predetermined pressure profile and the pressure characteristic detected by the sensors.

With the pressure accumulator shut off, the pressure sensors can be monitored in that a certain pressure characteristic is set via the pump, which is compared with the pressure characteristic detected by means of the pressure sensors.

Finally, the electronic control unit (ECU) of the inventive electrohydraulic braking system for motor vehicles can be adapted to operate the shut-off valve in the sense of an interruption of the connection between the hydraulic pump and the hydraulic pressure accumulator and to subject the hydraulic pump to control signals in such a manner that the hydraulic pump generates a hydraulic pressure which exceeds the maximum operating pressure of the hydraulic pressure accumulator.

In the case of a pressure build-up above the maximum operating pressure of the pressure accumulator becoming necessary, this can be also done by means of the pump within a shorter period of time with the pressure accumulator shut-off, It is also possible to employ a pressure accumulator with a smaller volume so that installation space can be saved, because a corresponding hydraulic pump can generate the desired pressure characteristics.

The invention therefore also relates to the operation of the electronic control unit (ECU), which results in connection with the inventive shut-off valve arrangement.

BRIEF DESCRIPTION OF THE DRAWING

The invention and its advantages will be explained in the following in more detail with reference to the accompanying drawing which in a schematic basic diagram shows an embodiment of an inventive "brake-by-wire" braking system with "push-through" capability.

DETAILED DESCRIPTION OF THE INVENTION

Figure 1:
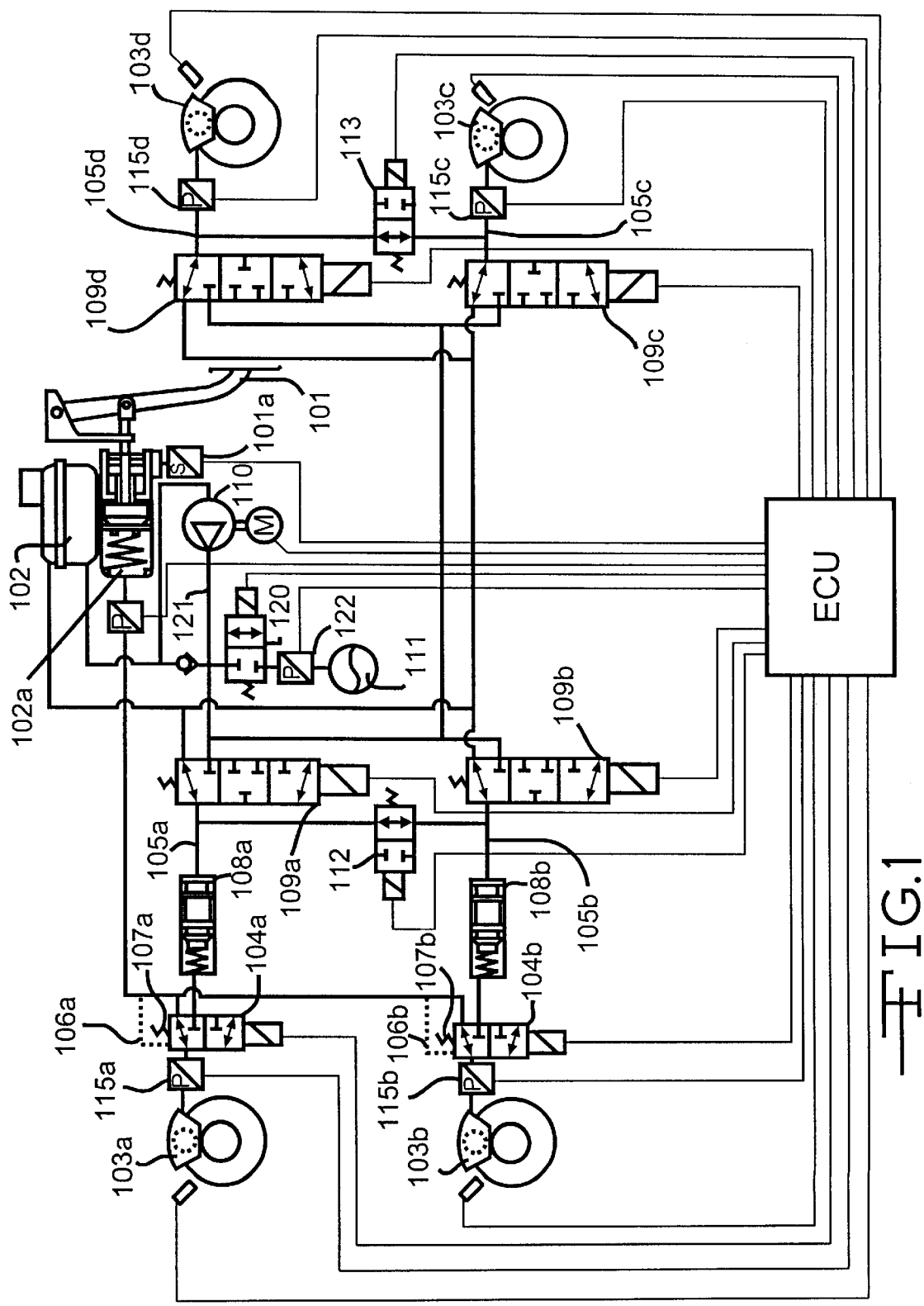

The braking system shown in the drawing comprises a "push-through" brake circuit 100 for emergency operation, which is supplied by a brake master cylinder 102 which can be operated via the brake pedal 101. The brake pedal 101 comprises a sensor 101a for the detection of the driver's request. The sensor 101a outputs, for example, an electric position and/or power signal which is derived from the actuation. The driver's request is transmitted to an electronic control unit ECU, evaluated therein and utilized for the generation of electric control signals for driving valves which will later be described in more detail and a hydraulic pump 110. Between the "push-through" brake circuit 100 and the wheel brakes of a vehicle axle 103a, 103b, changeover valves 104a, 104b are arranged for subjecting the wheel brakes 103a, 103b with brake fluid either via the "push-through" brake circuit 100 or via the electrically controlled brake ducts 105a, 105b ("brake-by-wire").

In the electrically non-operated condition, i.e. in their preferred position, the changeover valves 104a, 104b connect the "push-through" brake circuit 100 with the wheel brakes 103a, 103b, with the connection to the electrically controlled brake ducts 105a, 105b being blocked. Upon the electrical operation the changeover valves 104a, 104b connect the wheel brakes 103a, 103b with the associated electrically controlled brake ducts 105a, 105b each, with the connection to the "push-through" brake circuit 100 being locked in each case. In order to increase safety, for example in the case of a defective valve reset spring 107a, 107b, the changeover valves 104a, 104b each can be brought into the preferred position which corresponds to the "push-through" operation via pressure control lines 106a, 106b.

In addition, so-called disconnecting cylinders 108a, 108b each are arranged in the electrically controlled brake ducts 105a, 105b upstream of the changeover valves 104a, 104b. Said disconnecting cylinders 108a, 108b ensure a hydraulic decoupling between the "push-through" brake circuit 100 and the electrically controlled brake ducts 105a, 105b. More specifically, the disconnecting cylinders 108a, 108b are provided to prevent intermixing of fluid in the "push-through" brake circuit 100 and fluid in the brake ducts 105a, 105b in order to improve reliability of the braking system. While preventing intermixing, the disconnecting cylinders 108a, 108b function to permit pressurized fluid in the brake ducts 105a, 105b to act upon and be acted upon by the fluid between the disconnecting cylinders 108a, 108b and the respective vehicle wheel brake 103a, 103b to operate the respective vehicle wheel brake 103a, 103b.

The brake pressure modulation in the electrically controlled brake ducts 105a, 105b as well as in the electrically controlled brake ducts 105c, 105c which are associated with the wheel brakes of the other vehicle axle 103c, 103d is performed in a known manner via control valves 109a, 109b, 109c, 109d, with the brake pressure being provided by a unit which consists of a pump 110 which is driven by an electric motor and a pressure accumulator 111.

Shut-off valves 112 and 113, respectively, are arranged between the electrically controlled brake ducts of a vehicle axle 105a, 105b, 105c, 105d. In the non-operated condition said shut-off valves 112 and 113, respectively, connect the brake ducts 105a, 105b and 105c, 105d, respectively, with one another, while in the operated condition the brake ducts 105a, 105b and 105c, 105d, respectively, are locked against each other. This provides the possibility to hydraulically couple the brake ducts of a vehicle axle 105a, 105b and 105c, 105d, respectively. Due to the coupling, differences in the control behaviour between the brake ducts of a vehicle axle 105a, 105b and 105c, 105d, respectively, can be compensated, which for example may occur due to manufacturing tolerances. This is advantageous in particular in the case of a normal braking operation because the same pressure level is adjusted in each case in the wheel brakes of a vehicle brake 103a, 103b and 103c, 103d, respectively, as in a conventional braking system so that the stability of the vehicle is ensured. If, however, an individual regulation of the brake pressure in the wheel brakes 103a, 103b and 103c, 103d, respectively, required as it is the case i.a. with an antilock control system, an antislip control system or a driving dynamics control system, the hydraulic coupling of the brake ducts 105a, 105b and 105c, 105d, respectively, is cancelled by the operation of the shut-off valve 112 or 113, respectively.

The shut-off valve 120 which represents a major aspect of the invention and which is designed as a seat valve is arranged between the hydraulic pump 110 and the hydraulic pressure accumulator 111. Said shut-off valve 120 permits to avoid the leakage problems at the slide valves 109a to 109d. In addition, the motor pump unit (in lieu of the pressure accumulator 111 or to assist same) can be utilized for pressure modulation. In order to achieve a more rapid pressure build-up in particular above the operating pressure of the hydraulic pressure chamber 111, the hydraulic pressure chamber 111 can be disconnected from the remaining braking system by the shut-off valve 120. This enables a more dynamic pressure build-up.

The pressure in the pressure accumulator 111 is monitored by a sensor 122. If the pressure drops below a value of e.g. 110 bar, then the shut-off valve 120 is opened and the pump 121 is taken into operation in order to recharge the pressure accumulator. If, during the recharging operation, a brake actuation becomes necessary, then the shut-off valve 120 provides the possibility to shut off the pressure accumulator 111 so that the filling of the wheel brakes 103a, 103b, 103c, 103d with brake fluid can be effected immediately by the pump 111. If the pressure accumulator 111 is shut off, the pump does not deliver brake fluid into the pressure accumulator 111 during brake actuation so that pressure in the wheel brakes 103a, 103b, 103c, 103d can be built up more rapidly.

In the case of a pressure build-up above the maximum operating pressure of the pressure accumulator 111 becoming necessary, this can be also done by means of the pump 120 within a shorter period of time with the pressure accumulator 111 shut off.

With the pressure accumulator 111 shut off, the pressure sensors 115a, 115b, 115c, 115d can be monitored in that a certain pressure characteristic is set via the pump 110, which is compared with the pressure characteristic detected by means of the pressure sensors 115a, 115b, 115c, 115d.

We claim:

1. An electrohydraulic braking system for motor vehicles, comprising:
   a brake master cylinder which can be actuated by a brake pedal;
   a reservoir for hydraulic fluid;
   a brake means which can be coupled with at least one vehicle wheel and which can be connected with the brake master cylinder in order to subject the brake means with pressurized hydraulic fluid;
   an electronic control unit (ECU) which can be connected with a first sensor for detecting static and dynamic conditions which occur in the braking system which are indicative of operation of the brake pedal;
   a hydraulic pump having an input side and an output side, the input side of the hydraulic pump being permanently connected with the reservoir so as to be able to draw fluid therefrom; and
   a hydraulic pressure accumulator supplied by the hydraulic pump for the provision of pressurized hydraulic fluid which can be supplied to the brake means by a control valve arrangement operated by the electronic control unit (ECU) in a controlled manner in order to subject the brake means with pressurized hydraulic fluid, with a connection being arranged between the output side of the hydraulic pump and the hydraulic pressure accumulator, the connection between the output side of the hydraulic pump and the hydraulic pressure accumulator including a shut-off valve which can be selectively operated in order to make or shut off the connection between the output side of the hydraulic pump and the hydraulic pressure accumulator.

2. The electrohydraulic braking system for motor vehicles according to claim 1, with said shut-off valve being designed as a seat valve which can be operated electromagnetically.

3. The electrohydraulic braking system for motor vehicles according to claim 1, with the electronic control unit (ECU) being adapted to utilize signals output by the first sensor for the generation of control signals for the shut-off valve.

4. The electrohydraulic braking system for motor vehicles according to claim 1, further including a second sensor generating a signal indicative of pressure in the hydraulic pressure accumulator, and wherein the hydraulic pressure accumulator is a gas pressure accumulator and the electronic control unit (ECU) is further adapted to operate the hydraulic pump depending on the signal from the second sensor in order to charge the hydraulic pressure accumulator.

5. The electrohydraulic braking system for motor vehicles according to claim 4, with the electronic control unit (ECU) being adapted to operate the shut-off valve to selectively interrupt the connection between the hydraulic pump and the hydraulic pressure accumulator as a function of a signal of at least the first sensor, which represents an actuation of the brake pedal, as well as a signal of at least the second sensor, which represents a pressure which is below a predetermined hydraulic pressure in the hydraulic pressure accumulator.

6. The electrohydraulic braking system for motor vehicles according to claim 1, with the electronic control unit (ECU) being adapted to operate the shut-off valve to selectively interrupt the connection between the hydraulic pump and the hydraulic pressure accumulator and to control operation of the hydraulic pump based on a comparison of a pressure profile which is detected by a plurality of pressure sensors provided in the braking system and supplied to the electronic control unit (ECU) in the form of corresponding sensor signals and a predetermined pressure profile.

7. The electrohydraulic braking system for motor vehicles according to claim 1, with the electronic control unit (ECU) being adapted to operate the shut-off valve to interrupt the connection between the hydraulic pump and the hydraulic pressure accumulator and to subject the hydraulic pump with control signals in such a manner that the hydraulic pump generates a hydraulic pressure which preferably exceeds the maximum operating pressure of the hydraulic pressure accumulator.

* * * * *